C. H. VAN NOSTRAND AND H. E. SCHULSE.
APPARATUS FOR THE MANUFACTURE OF FILTERING FILMS.
APPLICATION FILED FEB. 8, 1918.
1,355,292.
Patented Oct. 12, 1920.
3 SHEETS—SHEET 1.
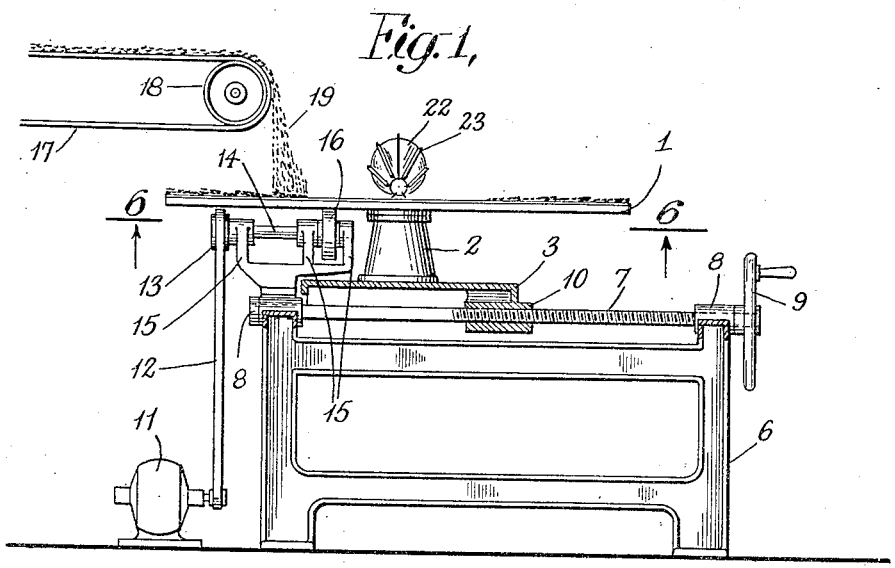
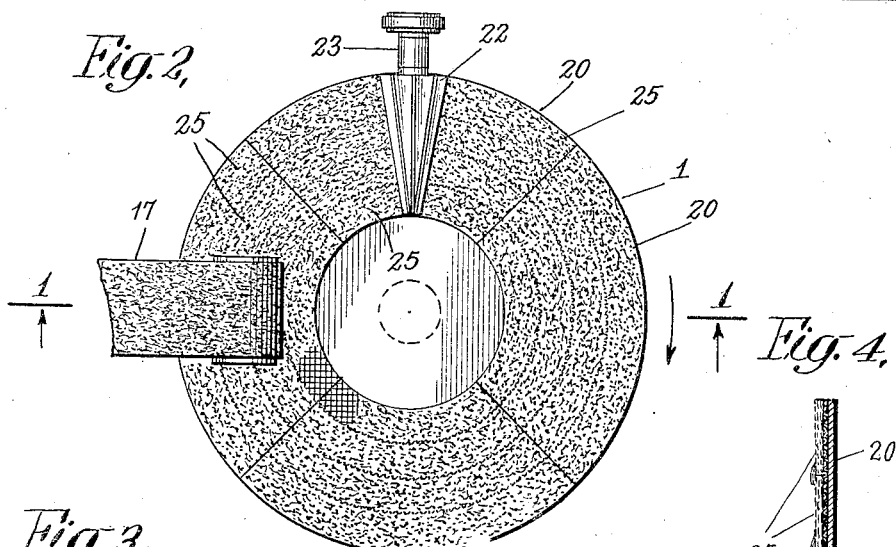
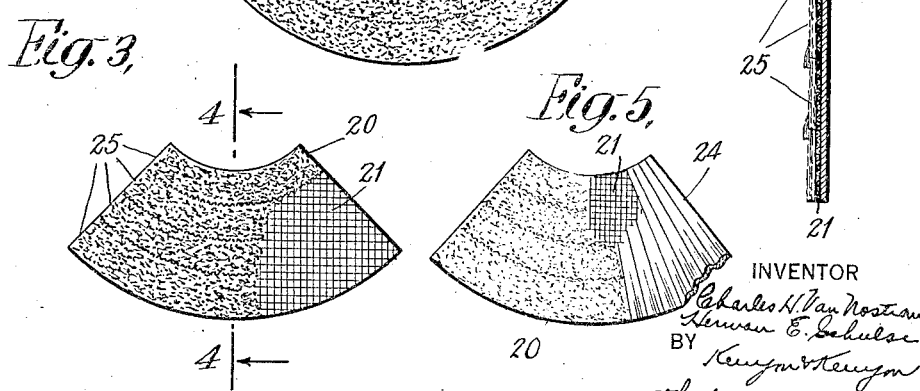
INVENTOR
Charles H. Van Nostrand
Herman E. Schulse
BY Kenyon & Kenyon
their ATTORNEYS C. H. VAN NOSTRAND AND H. E. SCHULSE.
APPARATUS FOR THE MANUFACTURE OF FILTERING FILMS.
APPLICATION FILED FEB. 8, 1918.
1,355,292.
Patented Oct. 12, 1920.
3 SHEETS—SHEET 2.
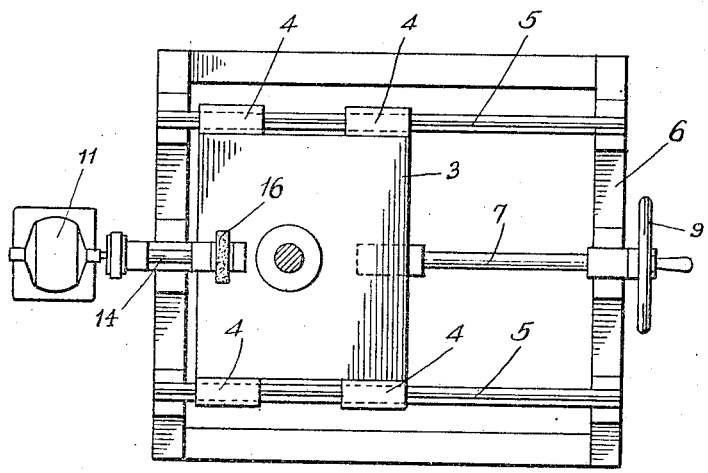
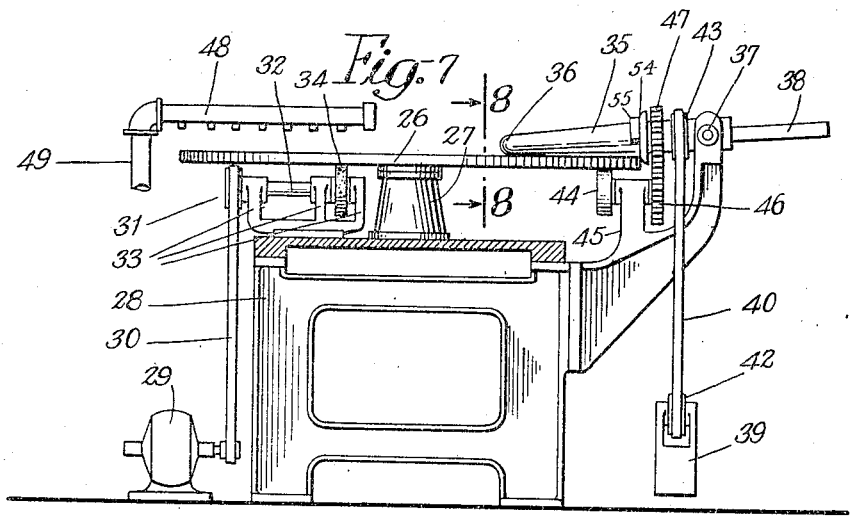
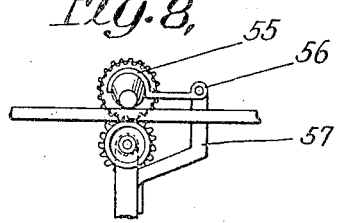

C. H. VAN NOSTRAND AND H. E. SCHULSE.
APPARATUS FOR THE MANUFACTURE OF FILTERING FILMS.
APPLICATION FILED FEB. 8, 1918.
1,355,292. Patented Oct. 12, 1920.
3 SHEETS—SHEET 3.
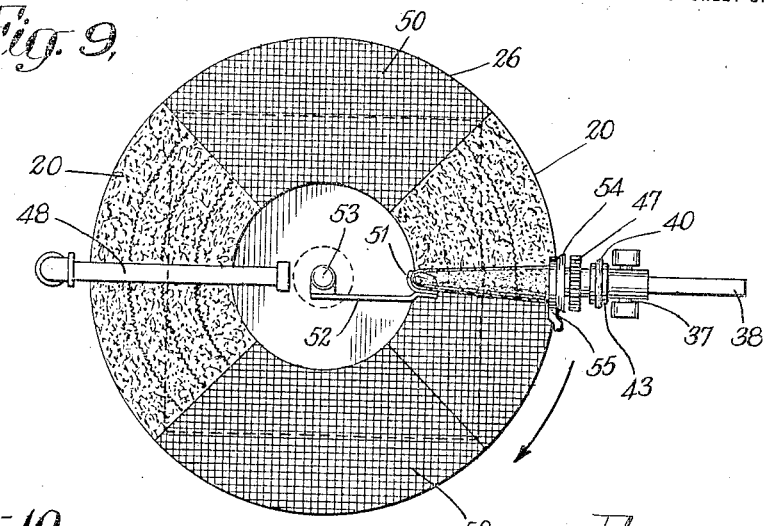
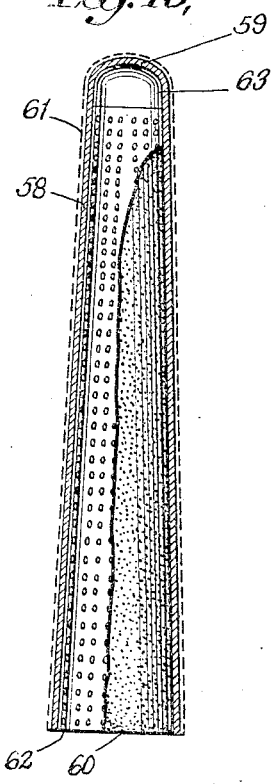
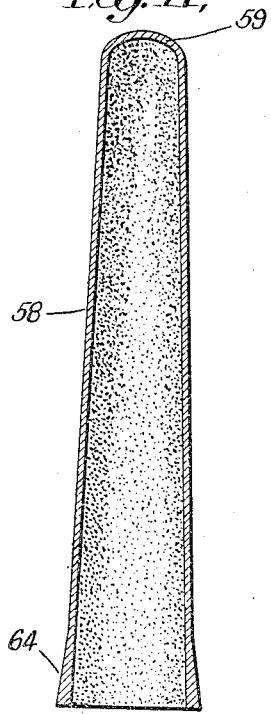
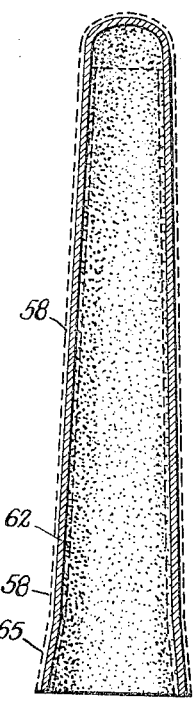
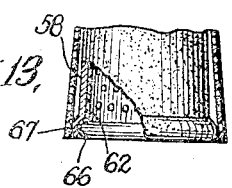
INVENTOR
Charles H. Van Nostrand,
Herman E. Schulse,
BY
Kenyon & Kenyon
their ATTORNEYS

UNITED STATES PATENT OFFICE.

CHARLES H. VAN NOSTRAND, OF ORANGE, AND HERMAN E. SCHULSE, OF JERSEY CITY, NEW JERSEY; SAID SCHULSE ASSIGNOR TO SAID VAN NOSTRAND.

APPARATUS FOR THE MANUFACTURE OF FILTERING-FILMS.

1,355,292.   Specification of Letters Patent.   Patented Oct. 12, 1920.

Application filed February 8, 1918. Serial No. 216,110.

*To all whom it may concern:*

Be it known that we, CHARLES H. VAN NOSTRAND and HERMAN E. SCHULSE, citizens of the United States, the former a resident of Orange, Essex county, State of New Jersey, and the latter a resident of Jersey City, Hudson county, State of New Jersey, have invented certain new and useful Improvements in Apparatus for the Manufacture of Filtering-Films, of which the following is a specification.

Our invention relates to apparatus for the manufacture of filtering films from fibrous filtering material. It has for its object to produce apparatus for making such filtering films that will be light in construction, and suitable in shape to be removable and replaceable in connection with suitable supporting devices, presenting a minimum of joints and clamping means therefor, and giving relatively large and efficient filtering surfaces and possessing other advantages herein recited with reference to such films; also to produce apparatus of the above character simple and efficient in construction and operation, and that will enable the operator to make such films quickly and cheaply.

It consists of the new and improved apparatus herein shown and described. In the drawings accompanying this specification we have shown our improved apparatus in its preferred form, and have explained in connection therewith our improved process for making such films, and our improved film produced thereby. We are not, however, in this application claiming the said process and product, as they form the subject-matter of another application executed simultaneously herewith.

Referring now to such drawings, Figure 1 is a side elevation, with parts in section on the line 1—1 of Fig. 2, of a revolving table and accompanying apparatus for making sheets from fibrous filtering material. Fig. 2 is a plan of the same. Fig. 3 is a plan of one of the sections or pans coated with fibrous material arranged in overlapping strips with part of the filtering material removed. Fig. 4 is a side view of the same to illustrate the overlapping strips, the strips being exaggerated in size for the purpose of clearness in illustration. Fig. 5 is a plan of a modified form of section or pan. Fig. 6 is a plan of the stationary support upon which the revolving table of Fig. 1 is placed. Fig. 7 is a front elevation of the forming table with the framework in section. Fig. 8 is a detail of the former and certain apparatus connected with it. Fig. 9 is a plan of the forming table. Figs. 10, 11, 12 and 13 are longitudinal sections through our improved film, Fig. 10 being also through the inner and outer perforated plates, Fig. 11 showing the film slightly thickened at its base, Fig. 12 showing the supporting perforated plates as inclined slightly outward at the base, and Fig. 13 showing a modified form of the base of the supporting plates.

In our improved process we first make a sheet or sheets of light fibrous filtering material of substantially the same thickness, texture and density generally throughout the sheet without matting the fibers, by spreading loose, light, fibrous filtering material on a suitable supporting surface or surfaces, and rolling it lightly in places or ridges to make the said sheet of the character described above, and we then bring such sheet or sheets, and a former of suitable material and of the shape of the film to be made into rolling contact with each other under pressure to cause the filtering material to be picked up by the former and formed into a film thereon of the same shape as the former, preferably moistening a sheet before bringing it into contact with the former, and then withdrawing the film from the former and repeating the operation.

Referring to the apparatus and the form of process shown and illustrated in the drawings, Figs. 1 to 6 inclusive illustrate the apparatus used in making the sheet of filtering material referred to above. 1 is a rotary table rotatably mounted on a standard 2 carried by a sliding block 3 having lugs 4, 4 running on guide rails 5, 5 secured to and forming part of stationary frame-work 6. 7 is a screw capable of rotating in bearings 8, 8 of the framework and carrying on its end an operating hand-wheel 9, by means of which the screw may be rotated. The screw passes through an internally screw-threaded sleeve 10 on block 3. By these means table 1 can be shifted as desired across the framework 6.

Table 1 may be rotated by any suitable means. Those shown consist of an electric motor 11 driving through belt 12, pulley 13, shaft 14 mounted in bearings in brackets 15, 15 of the framework. 16 is a friction wheel mounted on shaft 14 and bearing upon the under side of table 1 and rotating it by frictional pressure.

17 is a feeding belt running over pulley 18 feeding or spreading a stream 19 of fibrous filtering material upon table 1. The fibrous filtering material may be spread directly upon the surface of table 1 if desired. In practice we prefer to place upon the table pans or sections 20, as shown in the form substantially of sectors of a circle. These pans may be made of any suitable material, such, for instance, as card-board or metal. In practice we prefer to cover them with a material such as woven cloth or paper, as shown at 21, Fig. 3. 22 is a roller loosely rotating in a collar 23 secured to the frame-work. This roller is preferably provided with flutes or ribs 23. These ribs rest upon the loose fibrous material that has been fed upon the table, and as the table rotates, the roller rolls over the fibrous filtering material lightly, pressing it in places or ridges, smoothing and evening out the filtering material and making it into a sheet of the same thickness and porosity throughout without unduly compressing the fibers. The roller and its ribs are shown as tapering in order to compensate for the difference in speed of the rotation of the table at different points along the radius of the table.

Fig. 5 shows a modified form of the pan or section in which the surface 24 is made corrugated.

The general operation of the apparatus in this first step of our process, illustrated in Figs. 1 to 6 inclusive, is as follows. Any suitable fibrous filtering material may be used. In practice we prefer to use a loose light filtering material such as asbestos. This is spread in any suitable way over the revolving table 1, either with or without the sections or pans 20. For convenience and speed of operation and efficiency, we prefer to use the pans, shaped as shown, and with the pans coated with suitable material such as woven cloth, paper, &c., adapted to receive and give up the fibrous filtering material readily to the former. The fibrous filtering material may be spread upon the table or pans by any suitable mechanism, and may be prepared in any suitable way. We have shown, simply for illustration, as one method, a feeding belt 17 spreading a shower of asbestos fiber upon the table. As the apparatus for picking or preparing the fibrous material and supplying it to the belt, form no part of the invention, we have not illustrated it. We prefer to spread the fibrous filtering material in strips that will overlap one another along their edges. As shown in the drawings, these strips form concentric rings 25. This is accomplished in the apparatus shown by shifting the position of the table 1 along screw 7 of the framework. In this way the outer concentric ring 25 is first fed, then the table is moved to the left, as shown in Figs. 1 and 2, and the second concentric ring is spread upon the pan sections on the table, and preferably the outer edge of this concentric ring extends slightly over the inner end of the outermost concentric ring, and so on, with each inner concentric ring extending slightly over the inner edge of the next outer concentric ring, as clearly shown in Fig. 4. This overlapping, and the thickness of the film, are exaggerated in Fig. 4 (which represents a sheet unrolled) simply for purposes of illustration and clearness. Of course it will be understood that in making these concentric rings with overlapping edges, it is not essential that the table should be the movable element. It is only essential that either one or the other of the two elements, the table and the feed, should be shifted relatively one to the other; nor is it essential that the outer concentric rings be spread first.

We have found that if the fibrous filtering material is spread in the shape of strips or concentric rings and preferably overlapping at their edges, a stronger sheet is obtained and one more likely to be of even texture and density throughout its area generally than if the fibrous filtering material be spread over the table in another way. The overlapping of the edges of adjacent strips or rings tends also to strengthen the finished film and prevents the presence of thin spots in the films. It is of course highly important that a filtering film of the character shown and described, should not have spots or areas where the film is substantially thinner than at other points. The presence of thin spots decreases the efficiency of the film as a filtering medium, and tends to more speedy disruption of the film and a shorter life.

As the fibrous filtering material is being fed upon the table 1 in concentric rings, it is lightly pressed down by the fluted roller 22. This roller presses upon the filtering material simply along its ribs or flutes 23. It thus presses only in spots or places or lines. In practice we prefer to run the table so that the fibrous filtering material will be fed and passed under the fluted roller a number of times for each concentric ring so that the lines of pressure will very fully cover its surface. The result is that the filtering material is spread evenly and lightly into a laminated sheet that is of substantially the same thickness, and porosity throughout, and this is done without unduly compressing the fibers together. We have found that where the fibers are not evened off after the feeding or where they are pressed together with considerable force the films are apt to be irregular or not porous enough or of uneven porosity in different parts of their surfaces.

By using sectional pans we are enabled to make the sheet in suitable sizes so that the sheet on each section or pan is of just the proper size to make a single film. By the use of such sections on the spreading table we are also enabled to readily remove the pans to the forming table illustrated in Figs. 7-9, thus expediting and cheapening the process.

In Figs. 7-9 we have illustrated the apparatus used in the second or film-forming step of our operation. In this apparatus 26 is a revolving table mounted and revolving in the standard 27 fast on framework 28. The table, as shown, is driven by electric motor 29 through belt 30, pulley 31, shaft 32 mounted in bearings 33 carried by framework 28, and through friction wheel 34 fast on shaft 32. Wheel 34 bears on the under surface of table 26 and rotates it.

35 is the former. It is made of the same shape as that desired in the finished film. As shown, it is slightly tapering and turned up or rounded at the apex 36. The former may be made of any suitable material. We have found that a metal former coated with cloth or paper gives admirable results. The surface must not be too adhesive to prevent the removal of the film therefrom, but at the same time it must be sufficiently adhesive to pick up the sheet of fibrous material from the table or pans. The former is pivoted at 37 to the framework, and is provided with a handle 38, by means of which it may be tipped up and away from the table. 39 is a weight pressing former 35 downward by means of a belt 40 which runs over pulley 42 loose on the weight and pulley 43 on the former. The weight gives the necessary pressure to the former to cause it to pick up the sheet and to compress the sheet between the former and the surface of the table, as hereinafter described, to make the film sufficiently dense, smooth and hard.

Former 35 is rotated by means of a friction wheel 44 mounted on a short shaft carried in bearings in bracket 45 of the framework, the shaft carrying at its other end a gear 46 meshing with a gear 47 fast on former 35. By these means the former is rotated in the same direction as the table in order to pick up the sheet from the pan.

We prefer in practice to moisten the sheet of fibrous material before it is operated upon by, and also at, the former. For this purpose we provide a spraying device 48 connected by pipe 49 with some suitable supply of water or steam.

The operation of the second or forming step is as follows. The sections or pans are taken from table 1 and placed upon forming table 26. They may be placed upon it in any suitable way. We prefer to place the pans with intervening sections of table 26 without any pans. Table 26 is preferably covered with a suitable coating such as cloth or paper. In Fig. 9 we have shown two of the pans 20 with intervening spaces 50, 50 with the cloth exposed. After the pans are placed in operation the table is revolved and the former picks up the sheet on the first pan and rolls it into a laminated film of the same shape as the former, and as shown in Fig. 10. The finished film is slightly tapering. We prefer to form the apex closed, leaving only one opening in the film, namely, at the bottom. For this purpose we provide at the apex of the former a compressing spoon 51 with a hollowed out or spoon surface, and pressing against the rounded apex of the former. This rounded spoon forces the fibrous sheet up and around the apex of the former and compresses it around the apex to form a closed rounded apex for the film, strong and durable. Spoon 51 is carried on a spring arm 52 secured to the central axis 53 of the table.

In order to form a clear, sharply defined edge at the bottom of the film we arrange a curved collar 54 at the base of former 35, and a coöperating curved finger 55 pivoted at 56 to a bracket 57 from the framework. The collar and finger coöperate to press the sheet to form a clearcut lower edge. Finger 55 is loosely pivoted at 56 so that it may be lifted out of the way when it is desired to tip the former 35 up from the table. After rolling a sheet of one pan section 20 on to the former to form a film, we preferably continue the rotation of the table so that the film on the former is compressed between the former and the woven cloth section 50 of the table. This compresses the film still further to make it harder, stronger, denser and with a more polished or finished surface. When the end of section 50 is reached the table is stopped, and the former tipped up, when the film can be easily slipped off from the former. The film is now complete and ready for use. The former is tipped down again and the table started rotating, repeating the operation. When the second film has been formed and rolled over the succeeding cloth section 50, the table is again stopped, the former lifted, and the film removed. The empty pans are then removed and two other pans from table 1 are placed in position, and so on. By using rotating tables and in pairs, as shown, one a table to make the sectors of sheet fibrous material, and the other to receive the sheet sectors and form them into films, the films may be made very quickly, rapidly, cheaply and efficiently.

In Figs. 10 to 13 we have illustrated the finished films. 58 represents a finished film.

As shown, it is slightly tapering with apex 59 rounded and closed and having only one opening, namely, at the base 60. The films are of substantially even thickness, texture, and density throughout, and are free from thin or weak spots. Our improved films are easily and cheaply transportable, nesting into one another, either so that many can be packed into a small space, or even in certain instances the films can be flattened out for purposes of packing and transportation without substantial injury to their subsequent operation when restored to conical form.

Our improved films are particularly serviceable for use in connection with perforated inner and outer supports of substantially the same shape. 61 illustrates an outer perforated support and 62 an inner perforated support. The latter is preferably provided with an imperforate rounded apex 63. Our improved films are easily put in position in such supports and can be easily placed in filtering chambers, there being only one joint to be clamped, namely, at the opening of the filtering supports and films. At the apex there is no joint due to the imperforate cap or apex of the inner support, and to the closed or rounded top of the film 59 itself. The slightly tapering shape of the film, and its supports, enables a tight joint to be made at the bottom between them by merely slipping one over the other.

In Fig. 11 we have shown a film preferably thickened toward its base as shown at 64. This is obtained by simply feeding a little more of the fibrous material in at the outer section or ring of the sheet on table 1. In Fig. 12 we have shown the perforated supports 58 and 62 as slightly inclined outward toward the bottom as illustrated at 65. This is to further assist in tightening the joint at that part. In Fig. 13 we have shown the inner perforated support 62 as provided with a bead at 66. The film 58 at its base is compressed between the bead and the outer support.

It will be understood of course that many changes or modifications in the apparatus herein shown and above described may be made without departing from our invention, the essentials of which are set forth in the appended claims.

What we claim as new and desire to secure by Letters Patent, is:

1. In apparatus for making filtering films from loose fibrous filtering material, the combination of a rotary table having a surface for receiving the loose fibrous filtering material, a feeding device for spreading such filtering material thereon, means for moving such table and feeding device relatively to each other to feed said material in concentric rings upon said surface, and means for lightly pressing the filtering material on such surface in places or lines to spread it evenly thereon, whereby a sheet of filtering material of substantially the same porosity throughout will be formed on the said surface made up of concentric rings.

2. In apparatus for making filtering films from loose fibrous filtering material, the combination of a rotary table having removable pans of a sector-like shape adapted to rest upon said table and receive the fibrous filtering material, a feeding device for spreading such filtering material thereon, means for moving such surface and feeding device relatively to each other during the feeding operation, and means for lightly pressing the filtering material on said pans in places or lines to spread it evenly thereon, whereby a sheet of filtering material of substantially the same porosity throughout will be formed on each pan.

3. In apparatus for making filtering films from loose fibrous filtering material, the combination of a rotary table having removable pans of a sector-like shape adapted to rest upon said table and having a suitable non-adhesive surface to receive the fibrous filtering material, a feeding device for spreading such filtering material thereon, means for moving such table and feeding device relatively to each other to feed said material in concentric rings upon said surface, means for lightly pressing the filtering material on said pans in places or lines to spread it evenly thereon, whereby a sheet of filtering material of substantially the same porosity throughout will be formed made up of concentric rings.

4. In apparatus for making filtering films from loose fibrous filtering material, the combination of a rotary table having a surface for receiving the loose fibrous filtering material, a feeding device for spreading such filtering material thereon, means for moving the table relatively to the feeding device during feeding operation to cause the feed to be made upon the table in concentric rings, means for rotating the table adapted to rotate it at varying speeds so that the surface speed of any ring of filtering material being formed thereon will be the same as that of the other rings when being formed, means for lightly pressing the filtering material during the feeding in places or lines to spread it evenly thereon, whereby a sheet of filtering material of substantially the same porosity throughout will be formed on the said surface.

5. In apparatus for making filtering films from loose fibrous filtering material, the combination of a corrugated surface for receiving the loose fibrous filtering material, a feeding device for spreading such filtering material thereon, means for moving such surface and feeding device relatively to each other during the feeding operation, and means for lightly pressing the filtering material on such surface in places or lines to spread it evenly thereon, whereby a corrugated sheet of filtering material of substantially the same porosity throughout will be formed on the said surface.

6. In apparatus for making filtering films from loose fibrous filtering material, the combination of a receiving support, removable pans adapted to rest upon said support provided with suitable surfaces for receiving the filtering material, a feeding device for spreading such filtering material thereon, means for moving the receiving support and the feeding device relatively to each other during the feeding operation, means for lightly pressing the filtering material on said pans in places or lines to spread it evenly thereon, whereby a sheet of filtering material of substantially the same porosity throughout will be formed on each pan.

7. In apparatus for making filtering films from loose fibrous filtering material, the combination of a surface for receiving the loose fibrous filtering material, a feeding device for spreading such filtering material thereon, a fluted or ribbed roller adapted to roll over the fibrous material after it has been fed upon the surface to press it lightly and spread it evenly thereon, whereby a sheet of filtering material of substantially the same porosity throughout will be formed on the said surface.

8. In apparatus for forming filtering films from sheets of fibrous filtering material, the combination of a rotary table for the sheets of filtering material, a tapering former adapted to roll over and press upon a filtering sheet as the table rotates and pick up the sheet and form it into a tapering film, and means for rotating the former.

9. In apparatus for forming filtering films from sheets of fibrous filtering material, the combination of a former of the shape desired for the finished film, a support for the sheets of filtering material, separate and removable pans for the sheets adapted to be placed upon and carried by the said support, means for causing a rolling pressure contact between the former and a pan thus carried whereby the former will pick up the sheet from the pan and form it into a filtering film of the shape of the former.

10. In apparatus for forming filtering films from sheets of fibrous filtering material, the combination of a former of the shape desired for the finished film, a support for the sheets of filtering material having a non-adhesive surface, separate and removable pans for the sheets adapted to be placed upon and carried by the said support, means for causing a rolling pressure contact between the former and a pan thus carried, whereby, when a pan is placed upon said support leaving exposed a portion of the non-adhesive surface of the support adjacent to the pan, the former will pick up the sheet from the pan to form a film and will then roll it over the adjacent exposed surface of the support to press the film.

11. In apparatus for forming filtering films from sheets of fibrous filtering material, the combination of a former with a rounded end, means for bringing the sheets and former into contact under pressure to cause the sheets to be formed into films on the former, and a rounded compressing device adapted to force insulating material around and against the rounded end of the former to form a film with a closed apex.

12. In apparatus for forming filtering films from sheets of fibrous filtering material, the combination of a former of the shape desired for the finished film, a support for the sheets of filtering material, means for causing a rolling pressure contact between the former and the support, a collar adapted to bear against the edge of the filtering sheets, and a finger coöperating therewith and with the former whereby a filtering film of the shape of the former having a cleancut edge will be formed upon the latter.

13. In apparatus for forming filtering films from sheets of fibrous filtering material, the combination of a rotary table for the sheets of filtering material, a tapering former adapted to roll over and press upon a filtering sheet as the table rotates and pick up the sheet and form it into a tapering film, and pivoted so as to be raised from or brought into contact with, the table, a collar adapted to bear against the edge of the filtering sheets, and a finger coöperating therewith and with the former, and also pivoted so as to be moved out of engagement with the former and collar, whereby the film formed will have a cleancut edge.

14. In apparatus for making filtering films from loose fibrous filtering material, the combination of a rotary table having a surface for receiving the loose fibrous filtering material, a feeding device for spreading such filtering material thereon, means for lightly pressing the filtering material on such surface in places or lines to spread it evenly thereon, a rotary forming table, a tapering former adapted to roll over and press upon a filtering sheet as the table rotates and pick up the sheet and form it into a tapering film.

15. In apparatus for making filtering films from loose fibrous filtering material, the combination of a support, pans adapted to receive and carry the filtering material and to be placed upon and removed from said support, means for spreading and rolling such filtering material upon such pans to make sheets of filtering material thereon of substantially the same porosity throughout, another support adapted to receive such pans with the sheets formed thereon, a former of the shape of the films to be made, means for causing a rolling pressure contact between the former and the sheets upon such pans whereby a filtering film of the shape of the former will be formed thereon of even porosity throughout.

16. In apparatus for making filtering films from loose fibrous filtering material, the combination of a rotary table having removable pans of a sector-like shape adapted to rest upon said table and receive the fibrous filtering material, a feeding device for spreading such filtering material thereon, means for lightly pressing the filtering material on the pans in places or lines to spread it evenly thereon, a rotary forming table adapted to receive and carry said pans, a tapering former adapted to roll over and press upon the sheet in a pan as the table rotates, and pick up the sheet and form it into a tapering film.

17. In apparatus for making filtering films from loose fibrous filtering material, the combination of a rotary table, a feeding device for spreading filtering material thereon, means for adjusting the table and the feeding device toward or away from each other so that the feed will be made in concentric rings, means for driving the table adapted to vary its speed of rotation in accordance with its relative adjustment with the feeding device so that each concentric ring being fed will be fed at the same speed as that of the feed for other concentric rings, a pressing device for pressing lightly and in lines upon the material fed upon the table to form an even layer thereof, a rotary forming table upon which the sheets formed on the first mentioned rotary table may be placed, means for moistening such sheets, a tapering former adapted to roll in contact with the table, and means for driving the former whereby tapering filtering films may be made of equal porosity throughout from loose filtering material.

In testimony whereof, we have signed our names to this specification.

CHARLES H. VAN NOSTRAND.
HERMAN E. SCHULSE.